United States Patent
Tran et al.

(10) Patent No.: US 11,587,054 B2
(45) Date of Patent: Feb. 21, 2023

(54) OPTICAL-SCAN TRIGGERED ELECTRONIC FUNDS TRANSFER FOR PURCHASE TRANSACTION

(71) Applicant: MasterCard International Incorporated, Purchase, NY (US)

(72) Inventors: Yen Tran, Darien, CT (US); Shanthan Subramaniam, Baldwin Place, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 15/712,910

(22) Filed: Sep. 22, 2017

(65) Prior Publication Data
US 2019/0095886 A1 Mar. 28, 2019

(51) Int. Cl.
| | | |
|---|---|---|
| *G06Q 20/20* | (2012.01) | |
| *G06Q 20/10* | (2012.01) | |
| *G06Q 20/12* | (2012.01) | |
| *G06Q 20/32* | (2012.01) | |
| *G06Q 20/02* | (2012.01) | |
| *G06Q 20/38* | (2012.01) | |
| *G06Q 20/40* | (2012.01) | |
| *G06Q 40/02* | (2023.01) | |

(52) U.S. Cl.
CPC ......... *G06Q 20/108* (2013.01); *G06Q 20/027* (2013.01); *G06Q 20/10* (2013.01); *G06Q 20/3223* (2013.01); *G06Q 20/3274* (2013.01); *G06Q 20/385* (2013.01); *G06Q 20/40145* (2013.01); *G06Q 40/02* (2013.01)

(58) Field of Classification Search
CPC ........ G06Q 30/06; G06Q 20/32; G06Q 20/20; G06Q 20/12; G06Q 20/36
See application file for complete search history.

(56) References Cited

U.S. PATENT DOCUMENTS

| | | | |
|---|---|---|---|
| 2012/0209749 A1* | 8/2012 | Hammad | G06Q 30/06 705/27.1 |
| 2014/0289107 A1* | 9/2014 | Moshal | G06Q 20/14 705/40 |
| 2014/0372308 A1* | 12/2014 | Sheets | G06Q 20/40 705/44 |

(Continued)

OTHER PUBLICATIONS

"PCT Notification of Transmittal of the International Search Report and the Written Opinion", International Searching Authority, dated Nov. 15, 2018 (dated Nov. 15, 2018), International Application No. PCT/US2018/046652, 10 pp.

(Continued)

*Primary Examiner* — Hao Fu
(74) *Attorney, Agent, or Firm* — Buckley, Maschoff & Talwalkar LLC

(57) ABSTRACT

A transaction request is received. The transaction request includes a merchant identifier. The merchant identifier is for identifying a merchant. The merchant's banking details are appended to the transaction request. The transaction request, with the appended banking details, is transmitted to a user's bank. Confirmation is received that a transaction has been performed in accordance with the transaction request. A confirmation is transmitted to the merchant to indicate that the transaction has been performed.

5 Claims, 12 Drawing Sheets

(56) References Cited

U.S. PATENT DOCUMENTS

| | | | |
|---|---|---|---|
| 2015/0032623 A1* | 1/2015 | Friedman | G06Q 20/385 |
| | | | 705/44 |
| 2015/0088674 A1 | 3/2015 | Flurscheim et al. | |
| 2017/0068937 A1* | 3/2017 | Liezenberg | G06Q 20/0655 |
| 2017/0262832 A1 | 9/2017 | Deshpande et al. | |
| 2017/0279925 A1* | 9/2017 | Zhang | H04L 67/18 |
| 2018/0025331 A1* | 1/2018 | Dallenbach | G06Q 20/36 |
| | | | 705/39 |
| 2018/0165672 A1* | 6/2018 | Handley | G06Q 20/3278 |
| 2018/0330361 A1* | 11/2018 | Marra | G06F 21/35 |

OTHER PUBLICATIONS

"Indian First Examination Report", which was filed in the Indian Patent Office dated, Jun. 1, 2022 (dated Jun. 1, 2022), Indian Application No. 202047011778, 6 pp.

* cited by examiner

OPTICAL-SCAN TRIGGERED ELECTRONIC FUNDS TRANSFER FOR PURCHASE TRANSACTION

BACKGROUND

For many merchants, there are a number of options available for accepting payment for goods and services provided to consumers. One form of payment is cash, and others include credit and debit cards. It is, however, generally the case that merchants are not equipped to receive payment by funds transferred directly to their bank accounts. It could be contemplated to provide an infrastructure at the point of sale to support merchant payment acceptance by electronic funds transfer (EFT), but such infrastructure—if it were to resemble a typical POS (point of sale) terminal in its main aspects—might prove to be quite expensive.

The present inventors have now recognized a cost effective approach to enabling merchant payment acceptance via EFT.

BRIEF DESCRIPTION OF THE DRAWINGS

Features and advantages of some embodiments of the present disclosure, and the manner in which the same are accomplished, will become more readily apparent upon consideration of the following detailed description of the invention taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a purchaser/consumer may use his/her mobile device to scan a quick response (QR) code presented by the merchant at the point of sale. The consumer's device may transmit a transaction request to a payment services provider. The transaction request may identify the merchant based on data obtained by the scan of the QR code. The payment services provider may retrieve banking information for the merchant and the consumer, and then may transmit the payment request, including banking information, to the consumer's bank. The consumer's bank may transmit the identification of the merchant to the consumer's mobile device for review and confirmation by the consumer. The consumer may enter the transaction amount into his/her mobile device and then confirm to his/her bank that the transaction is to go forward. The consumer's bank may then execute an EFT (electronic funds transfer) transaction for the amount of the transaction, with debiting of the amount from the consumer's account at the consumer's bank and crediting of the merchant's account at the merchant's bank. Confirmation that the funds transfer has occurred may be forwarded to the consumer, the payment services provider, and the merchant.

This payment transaction arrangement may be highly convenient and efficient, while requiring little or no investment or data processing integration on the part of the merchant.

Figure 1:
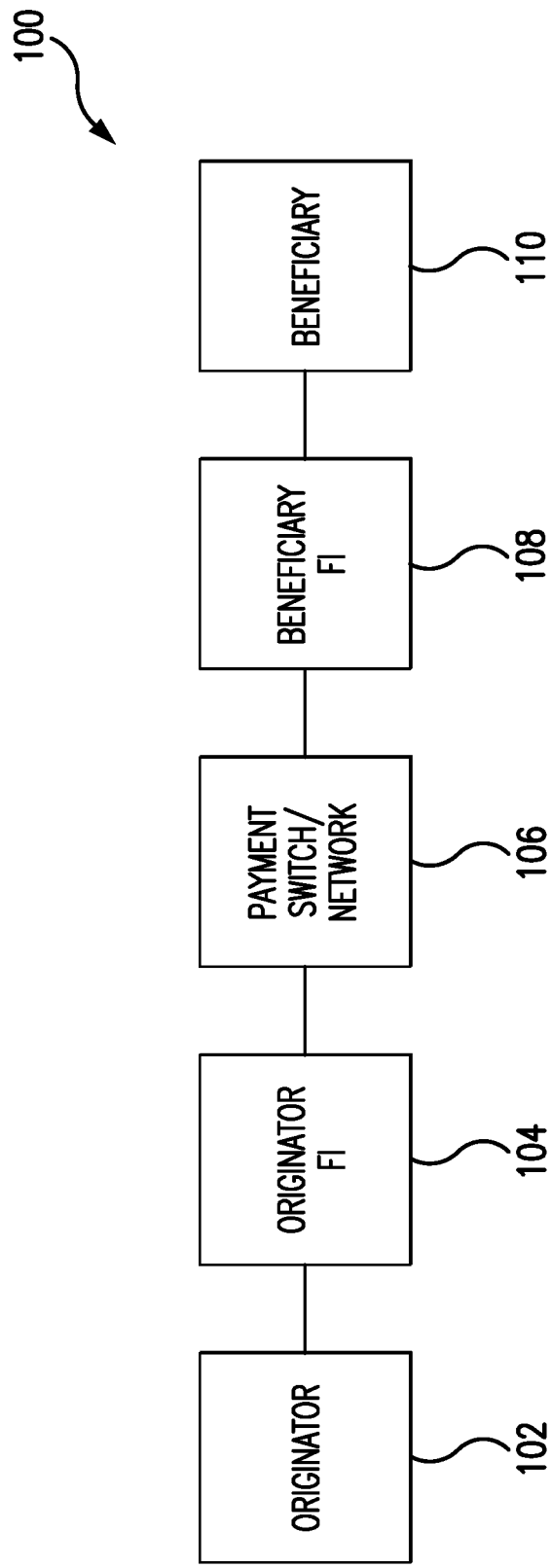
FIG. 1 is a block diagram of a payment system such as an EFT (electronic funds transfer) system.

FIG. 1 is a block diagram that illustrates a payment network system 100, of which one example is the ACH (automated clearing house) system operated in the United States.

The system 100 includes an originator device 102, which may be a computer operated by an originator of a transaction. Common kinds of transactions are credit transactions and debit transactions. The originator is the party that initiates the transaction. The originator may be, for example, an individual or a corporation or other organization.

The system 100 further includes an originator FI (financial institution) computer 104. The originator FI computer 104 receives payment instructions from the originator and forwards data entries that reflect the instructions to a payment system switch/network 106, which is also part of the system 100. The originator FI computer 104 may be operated by an originator FI of which the originator is a customer. The switch/network 106 may be operated by a governmental or private entity that serves as a clearing facility for the system 100.

Also included in the system 100 is a beneficiary FI computer 108. The beneficiary FI computer 208 receives entries from the payment system switch/network 106 and posts entries to accounts of depositors.

Still further, the system 100 includes a beneficiary 110 that is one of the depositors of the beneficiary FI. In the case of a credit transaction, the account at the beneficiary FI of the beneficiary may be credited with the amount instructed to be paid by the originator device 102. The beneficiary may be, for example, an individual or a corporation or other organization. Both FIs may typically be banks, although other types of FIs or other types of organizations may play roles like the FIs referred to in connection with FIG. 1.

The communications among the parties in the system 100 may typically be conducted using XML (eXtensible Markup Language) and may comply with a standard according to ISO 20022.

The components of the system 100 as depicted in FIG. 1 are only those that are needed for processing a single transaction. A typical payment network system may process many transactions (including simultaneous transactions) and may include a considerable number of FIs and their computers, one or more clearing operators, and numerous originators and beneficiaries. A system of the kind illustrated in FIG. 1 is sometimes referred to as an EFT (electronic funds transfer) system.

Figure 2:
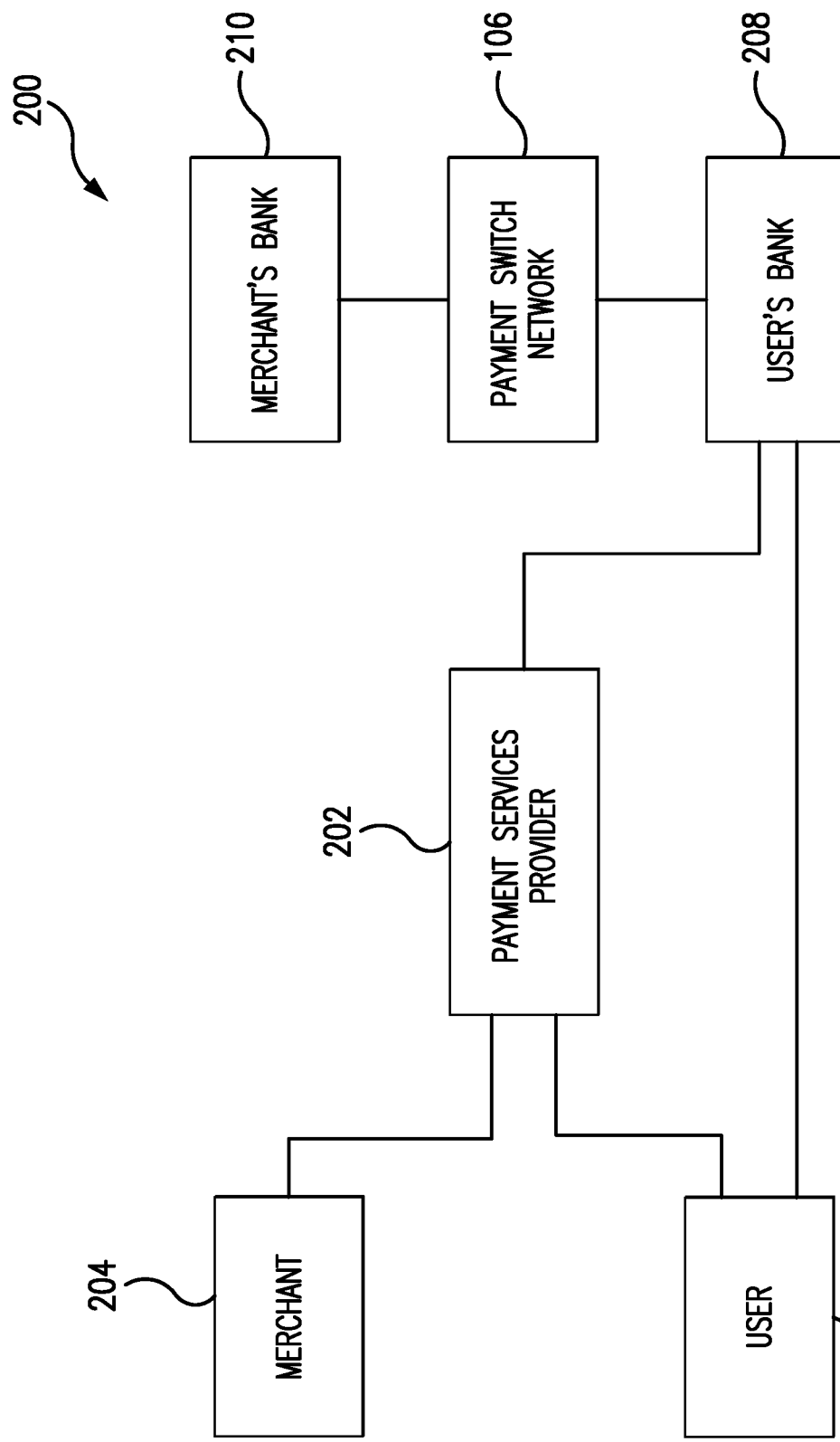
FIG. 2 is block diagram that illustrates an embodiment of a payment system according to aspects of the present disclosure.

FIG. 2 is a block diagram of a payment system 200 provided in accordance with aspects of the present disclosure.

The payment system 200 may include a payment services provider 202. The payment services provider 202 may perform a central role in the payment system 200. Details of the payment services provider 202 and the functions it performs will be described below.

The payment system 200 may also include a merchant 204 and a user 206. The merchant or payment recipient 204 may be a supplier of goods to the user or buyer 206. The user 206 may be located at the merchant's premises (not separately indicated) at the time a payment transaction is performed in accordance with teachings of this disclosure. Each of the merchant 204 and the user 206 may be in communication with the payment services provider 202 at appropriate times to allow the payment services provider to facilitate payments in a manner described herein.

The payment system 200 may further include the user's bank 208—i.e., a bank or other financial institution at which the user has a deposit account. The payment services provider 202 may be in communication with the user's bank 208, which in turn may be in communication with the user 206.

The payment system 200, still further, may include a payment switch/network 106—i.e., akin to or indistinguishable from the payment switch/network 106 depicted in and described in connection with FIG. 1. In addition, the payment system 200 may include the merchant's bank 210. The merchant's bank 210 may be a bank or other financial institution at which the merchant 204 has a deposit account. The merchant's bank 210 may be similar to or indistinguishable from the beneficiary FI 108 shown in FIG. 1. The user's bank 208 may be in communication with the payment network/switch 106, which in turn may be in communication with the merchant's bank 210. The user's bank 208 may also be in communication with the user 206.

Each block that represents a party/entity in FIG. 2 should also be understood to represent a computing device or other intelligent device operated by or on behalf of the respective party/entity. Thus, block 204 should be deemed to represent a point of sale terminal or other device operated by the merchant in connection with transactions as described herein. Block 206 should be deemed to represent a smartphone or other mobile device operated by the user. Each of blocks 202, 208, 106 and 210 should be deemed to represent a respective server computer, mainframe computer or dedicated or contracted-for cloud computing resources. The server computers of the payment services provider 202 and the user's bank 208 are typically remote from the merchant's premises. That is, those servers may be dozens, hundreds or thousands of miles distant from the merchant's premises.

The components of the system 200 as depicted in FIG. 2 are only those that are needed for processing a single transaction. A practical embodiment of the payment system 200 may process many transactions (including simultaneous transactions) and may include more than one payment services provider, numerous merchants and users operating respective devices, potentially a considerable number of user banks and merchant banks, and perhaps more than one payment switch/network.

Figure 3:
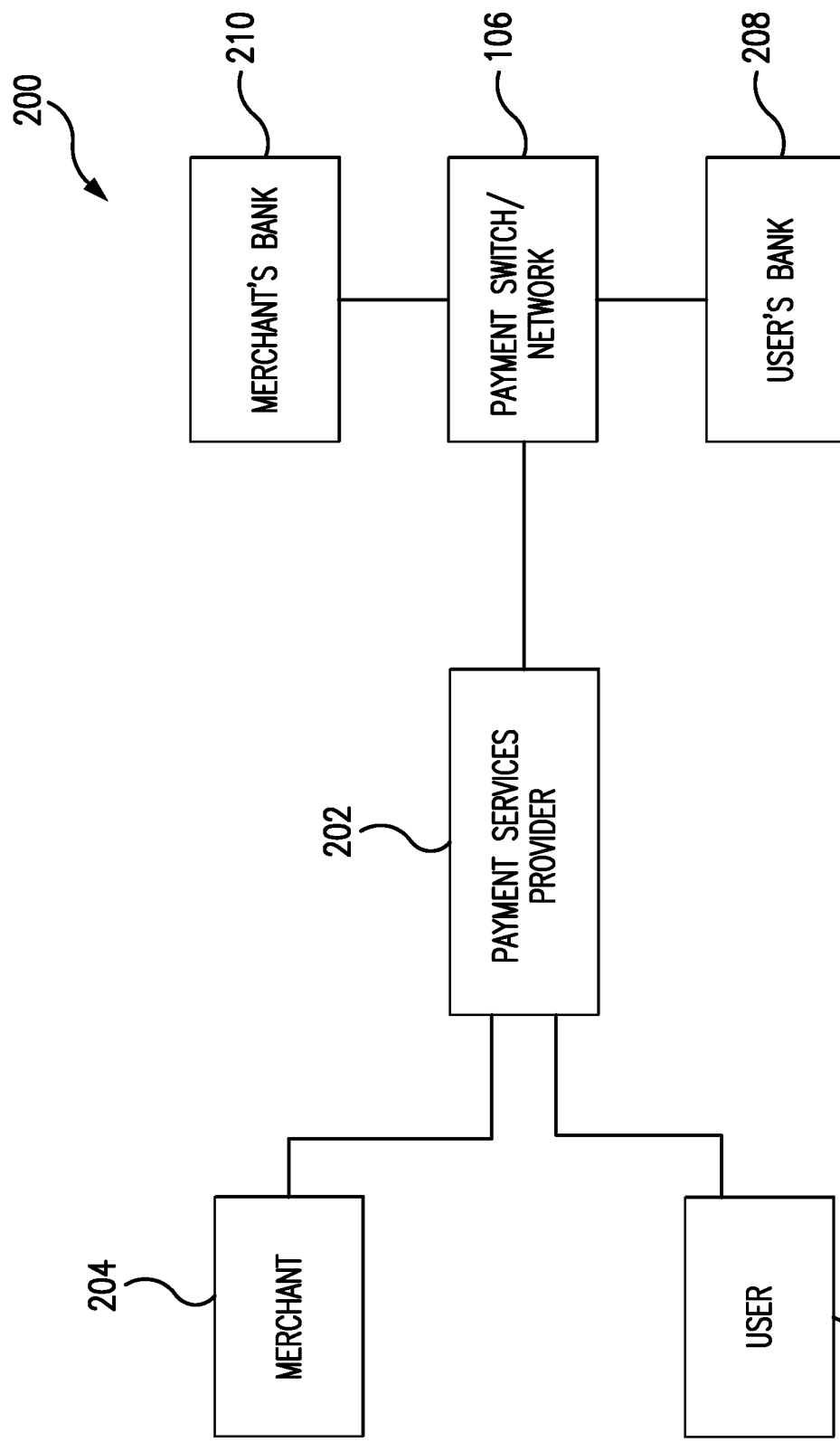
FIG. 3 is a block diagram that illustrates alternative aspects of the payment system of FIG. 2.

FIG. 3 is a block diagram of an alternative configuration of the payment system 200 of FIG. 2. All the components/entities as described above in connection with FIG. 2 are also present in FIG. 3. In the configuration of FIG. 3, the payment services provider 202 may be in communication with the payment switch/network 106 rather than with the user's bank 208. As will be understood from subsequent discussion, the payment system 200 may implement the topology illustrated in FIG. 2 in connection with some transactions, and may implement the topology illustrated in FIG. 3 in connection with other transactions. The particular topology in effect for a given transaction may depend on pre-existing relationships between the parties. Alternatively, the disparate topologies shown in FIGS. 2 and 3 may be considered to represent different embodiments of the payment system 200.

Figure 4:
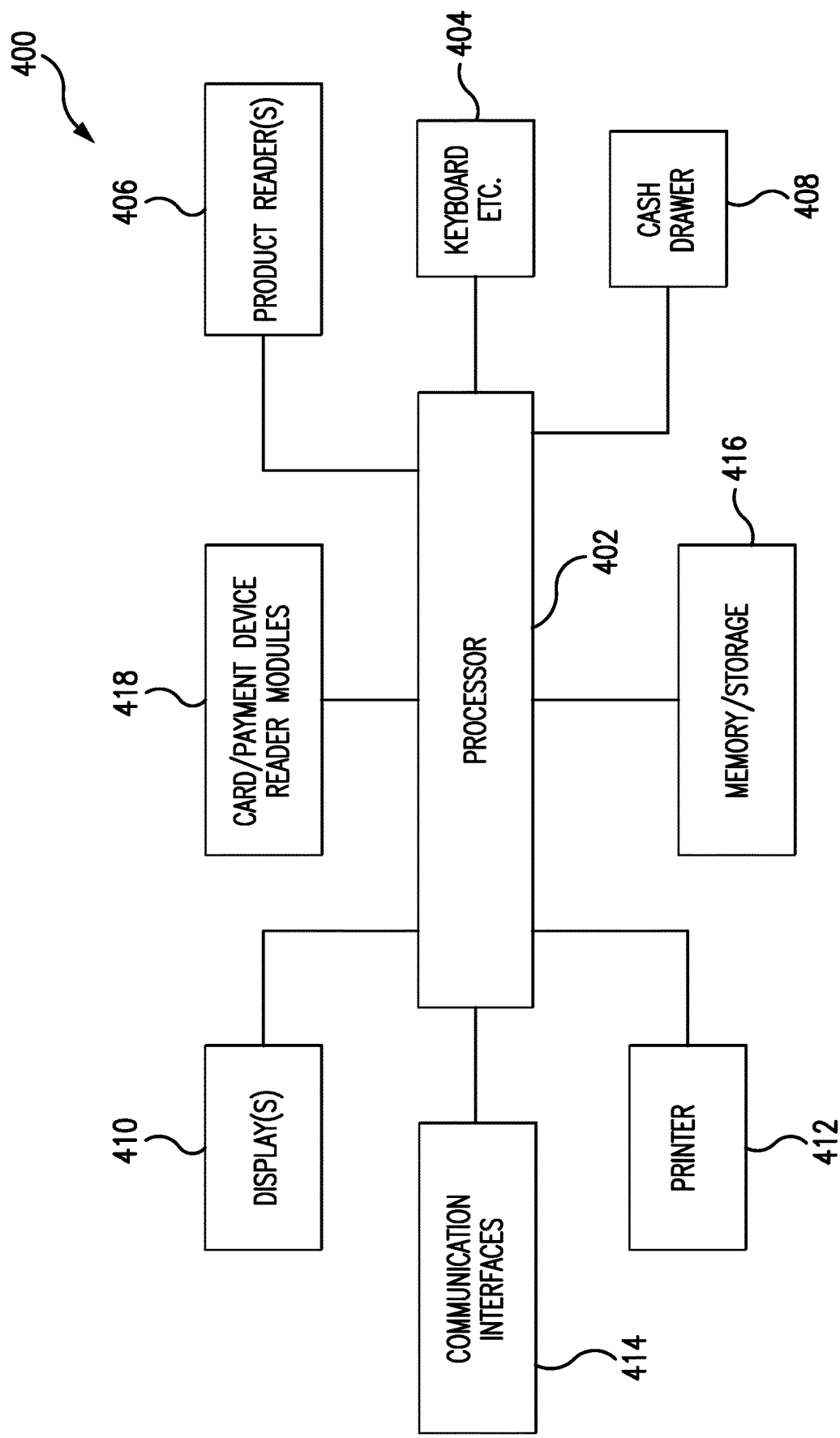
FIG. 4 is a block diagram of a typical point of sale device that may play a role in the system of FIG. 2 or 3.

FIG. 4 is a block diagram that illustrates an embodiment of the point of sale (POS) device 400 that may be operated by the merchant 204 in the payment system of FIG. 2/3. In some embodiments, the POS device 400 may resemble, in many respects, a POS terminal such as is typically found in a retail store. In other embodiments, the hardware making up the POS device 400 may be, for example, a suitably programmed and accessorized tablet computer. The POS device 400 may be programmed in accordance with aspects of the present disclosure to provide functionality as described herein.

Referring now to FIG. 4, the POS device 400 may include a processing element (or elements) such as the processor 402 shown in FIG. 4. The processor 402 may, for example, be a commercially available microprocessor, and may operate to control the overall functioning of the POS device 400.

The POS device 400 may also include peripheral components, in communication with and/or controlled by the processor 402, such as: (a) a keyboard 404 for receiving input from the human operator of the POS device 400, together with other input devices (not separately shown, such as a numeric keypad, a mouse, and/or a touch screen); (b) a product reader 406 for reading any form of unique product identifier, such as a barcode or RFID, that appears on, or is attached to, products brought to the POS device 400 for purchase; (c) a cash drawer 408 for storing cash received from customers; (d) one or more displays 410 for providing output (e.g., for identifying products presented for purchase and their prices, indicating sales tax due, indicating transaction subtotals and totals, etc., providing prompts to the customer and/or to the merchant's employee); (e) a printer 412 for printing out documents and/or sales receipts; and (f) one or more communication interfaces 414 for allowing the processor 402, and hence, the POS device 400 to engage in communication over data networks with other devices (e.g., the payment services provider 202 and one or more other devices located on the premises of the merchant).

In addition, the POS device 400 may include one or more memory and/or data storage devices (indicated collectively at 416), which may comprise any combination of one or more of a hard disk drive, RAM (random access memory), ROM (read only memory), flash memory, etc. The memory/data storage device(s) 416 may store software and/or firmware that programs the processor 402 and the POS device 400 to perform functionality as described herein. Thus the memory/data storage device(s) 416 may be in communication with the processor 402. Further, the POS device 400 may include one or more housings (not shown) which contain and/or support one or more of the other components shown in FIG. 4.

Further, the POS device 400 may include one or more card/payment device-reader elements (block 418) such as a mag stripe reader, a contact IC card reader, a contactless IC card reader, NFC communications capabilities (for communicating with payment-enabled mobile devices), etc. The reader elements 418 may be in communication with the processor 402.

Figure 5:
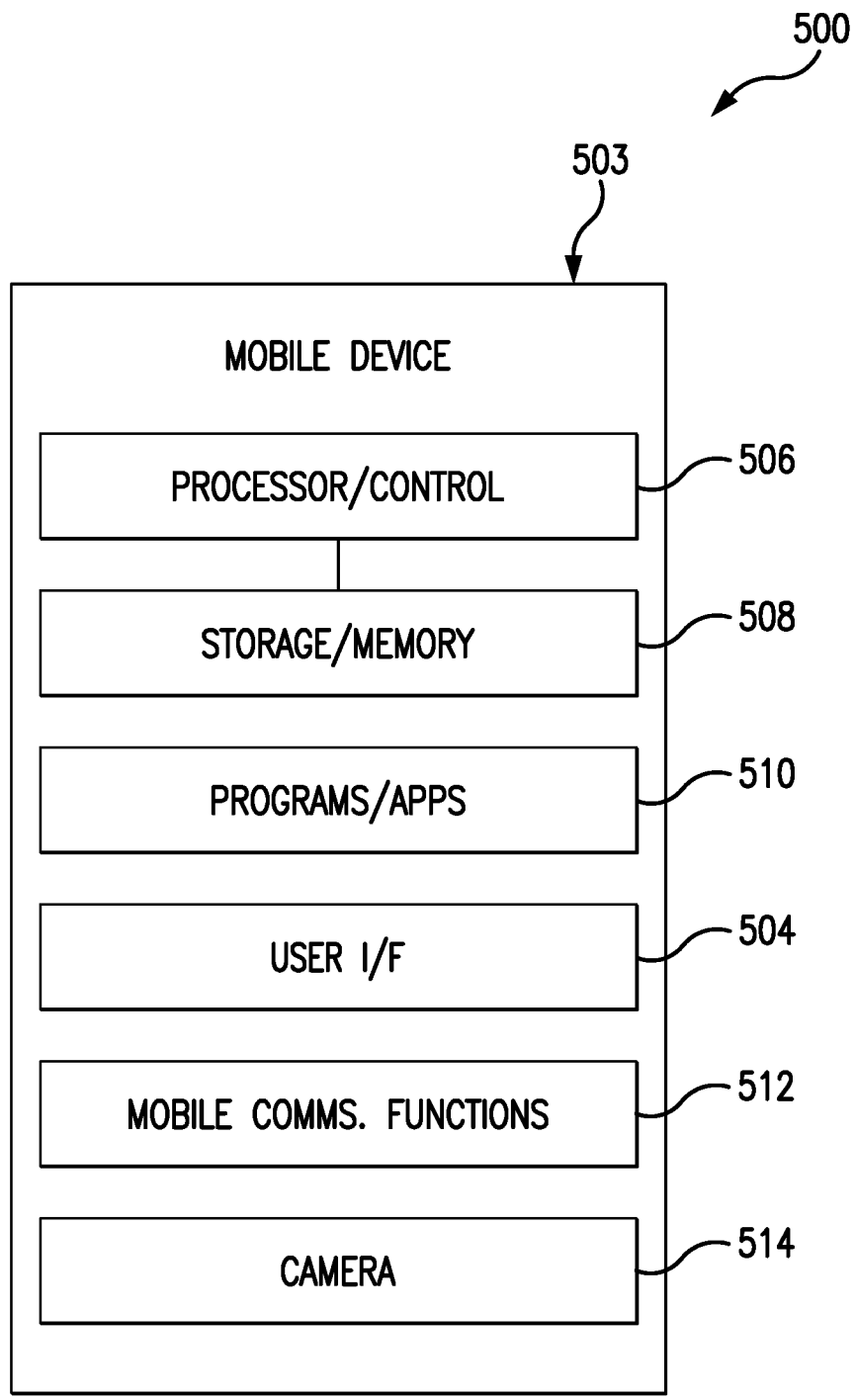
FIG. 5 is a simplified block diagram of a typical mobile device that may be employed by a buyer in the system of FIGS. 2 and/or 3.

FIG. 5 is a simplified block diagram illustration of a typical mobile device 500 that may be used by the user in connection with the payment system 200 of FIGS. 2/3.

To some extent, it will be posited in the following discussion, without limitation, that the mobile device 500 is a smartphone.

The mobile device 500 may include a housing 503. In many embodiments, the front of the housing 503 is predominantly constituted by a touchscreen (not separately shown), which is a key element of the user interface 504 of the mobile device 500.

The mobile device 500 further includes a mobile processor/control circuit 506, which is contained within the housing 503. Also included in the mobile device 500 is a storage/memory device or devices (reference numeral 508). The storage/memory devices 508 are in communication with the processor/control circuit 506 and may contain program instructions to control the processor/control circuit 506 to manage and perform various functions of the mobile device 500. As is well-known, a smartphone may function as what is in effect a pocket-sized personal computer, via programming with a number of application programs, or "apps", as well as a mobile operating system (OS). (The apps are represented at block 510 in FIG. 5, and may, along with other programs, in practice be stored in block 508, to program the processor/control circuit 506.) In some embodiments, a specialized app (not separately shown) may run in the mobile device 500 to support functioning of the mobile device 500 in connection with the payment system 200. However, in other embodiments, the mobile device may perform required functionality as described herein via a mobile browser (not separately shown) that interacts with one or more webpages hosted by other parties in the payment system 200.

As is typical for smartphones, the mobile device 500 may include mobile communications functions as represented by block 512. The mobile communications functions may include voice and data communications via a mobile communication network (not shown) with which the mobile device 500 is registered. Still further, as is now typical of many mobile devices, the mobile device 500 may include a digital camera component 514. As will be seen, the digital camera component 514 may be used to scan QR codes presented by merchants to launch payment processing transactions as described herein.

From the foregoing discussion, it will be appreciated that the blocks depicted in FIG. 5 as components of the mobile device 500 may in effect overlap with each other, and/or there may be functional connections among the blocks which are not explicitly shown in the drawing. It may also be assumed that, like a typical smartphone, the mobile device 500 may include a rechargeable battery (not shown) that is contained within the housing 503 and that provides electrical power to the active components of the mobile device 500.

Although the mobile device 500 has been described herein primarily as a smartphone, in other embodiments, other types of mobile devices (e.g., a tablet computer) may be used in place of a smartphone.

Figure 6:
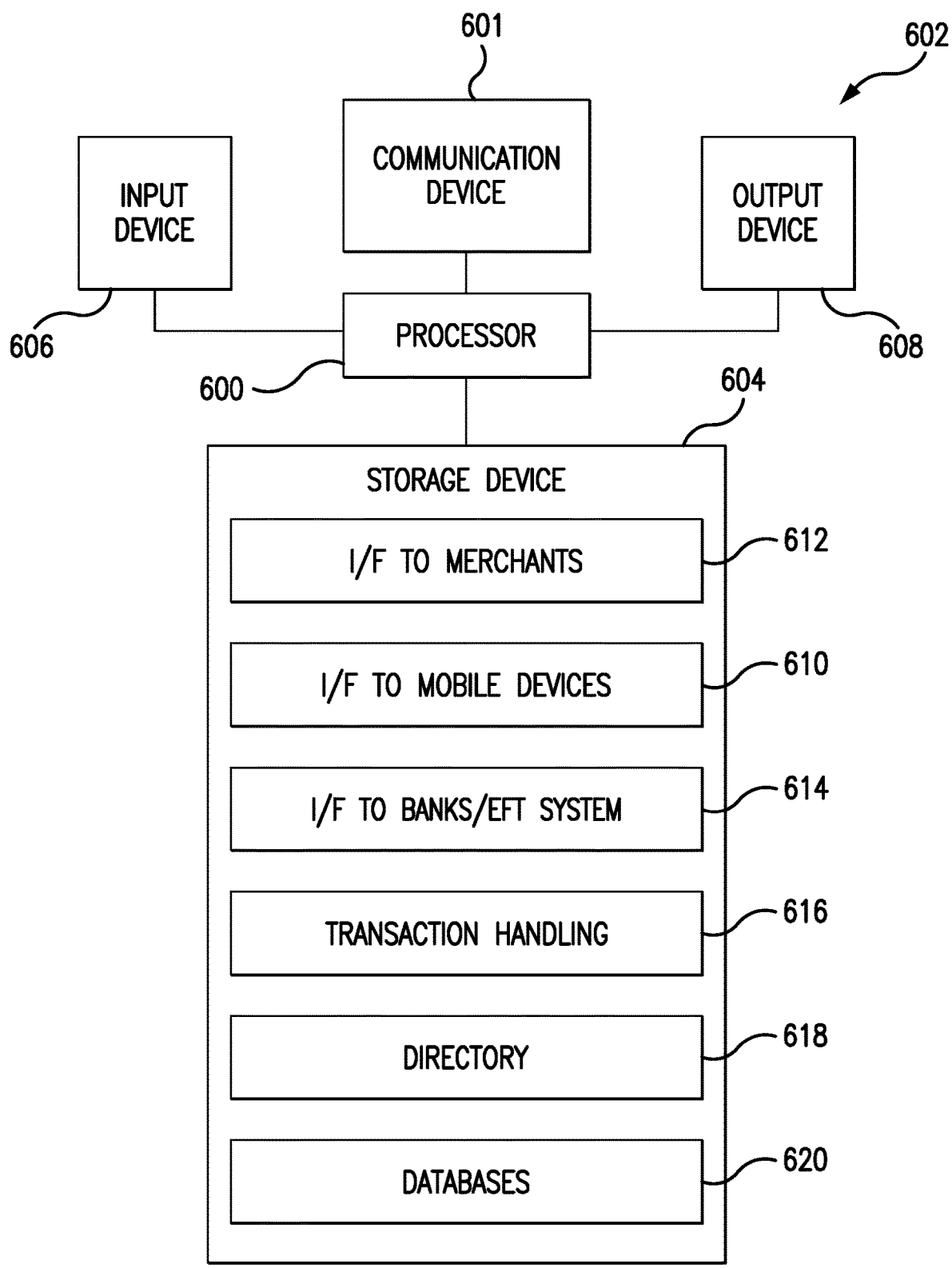
FIG. 6 is a block diagram of a computer system that may play a role in the system of FIGS. 2 and/or 3.

FIG. 6 is a block diagram of an example computer system 602 that may perform functions in the payment system of FIGS. 2/3. The computer system 602 may be operated by the payment services provider 202, and may accordingly be referred to hereinafter as a "payment services provider computer".

Referring now to FIG. 6, the payment services provider computer 602 may, in its hardware aspects, resemble a typical server computer and/or mainframe computer, but may be controlled by software to cause it to function as described herein.

The payment services provider computer 602 may include a computer processor 600 operatively coupled to a communication device 601, a storage device 604, an input device 606 and an output device 608. The communications device 601, the storage device 604, the input device 606 and the output device 608 may all be in communication with the processor 600.

The computer processor 600 may be constituted by one or more processors. Processor 600 operates to execute processor-executable steps, contained in program instructions described below, so as to control the payment services provider computer 602 to provide desired functionality.

Communication device 601 may be used to facilitate communication with, for example, other devices (such as other components of the payment system 200). Communication device 601 may comprise numerous communication ports (not separately shown), to allow the payment services provider computer 602 to communicate simultaneously with a number of other computers and other devices, including communications as required to simultaneously handle numerous requests for payment transactions.

Input device 606 may comprise one or more of any type of peripheral device typically used to input data into a computer. For example, the input device 606 may include a keyboard and a mouse. Output device 608 may comprise, for example, a display and/or a printer.

Storage device 604 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 604 stores one or more programs for controlling processor 600. The programs comprise program instructions (which may be referred to as computer readable program code means) that contain processor-executable process steps of the payment services provider computer 602, executed by the processor 600, to cause the payment services provider computer 602 to function as described herein.

The programs may include one or more conventional operating systems (not shown) that control the processor 600 so as to manage and coordinate activities and sharing of resources in the payment services provider computer 602, and to serve as a host for application programs (described below) that run on the payment services provider computer 602.

The programs stored in the storage device 604 may include, for example, a software interface 610 that supports communications between the payment services provider computer 602 and mobile devices operated by users.

The programs stored in the storage device 604 may also include a software interface 612 that supports communication between the payment services provider computer 602 and devices operated by merchants.

The storage device 604 may further store a software interface 614 that supports communications between the payment services provider computer 602 and a number of user's banks, such as the bank 208 shown in FIG. 2. In addition or alternatively, the software interface 614 may support communications between the payment services provider computer 602 and the payment switch/network 106.

Still further, the storage device 604 may store a transaction handling application program 616. The transaction handling application program 616 may operate to handle payment transactions requested by users, as described herein.

The storage device 604 may also store, and the payment services provider computer 602 may also execute, other programs, which are not shown. For example, such programs may include communications software and a reporting application. The latter program may respond to requests from system administrators for reports on the activities performed by the payment services provider computer 602. The other programs may also include, e.g., device drivers, database management software, etc.

In addition, the storage device 604 may store a directory 618 of individuals/organizations that may render or receive payments via the payment system 200. The directory may map users' (including merchants') alias identifiers to the banking details, such as the users'/merchants' banks and bank account numbers. It is to be understood that the user 206 shown in FIG. 2 may be one such user, and the merchant 204 shown in FIG. 2 may be one such merchant.

The storage device 604 may also store one or more databases 620 needed for operation of the payment services provider computer 602.

Figure 7:
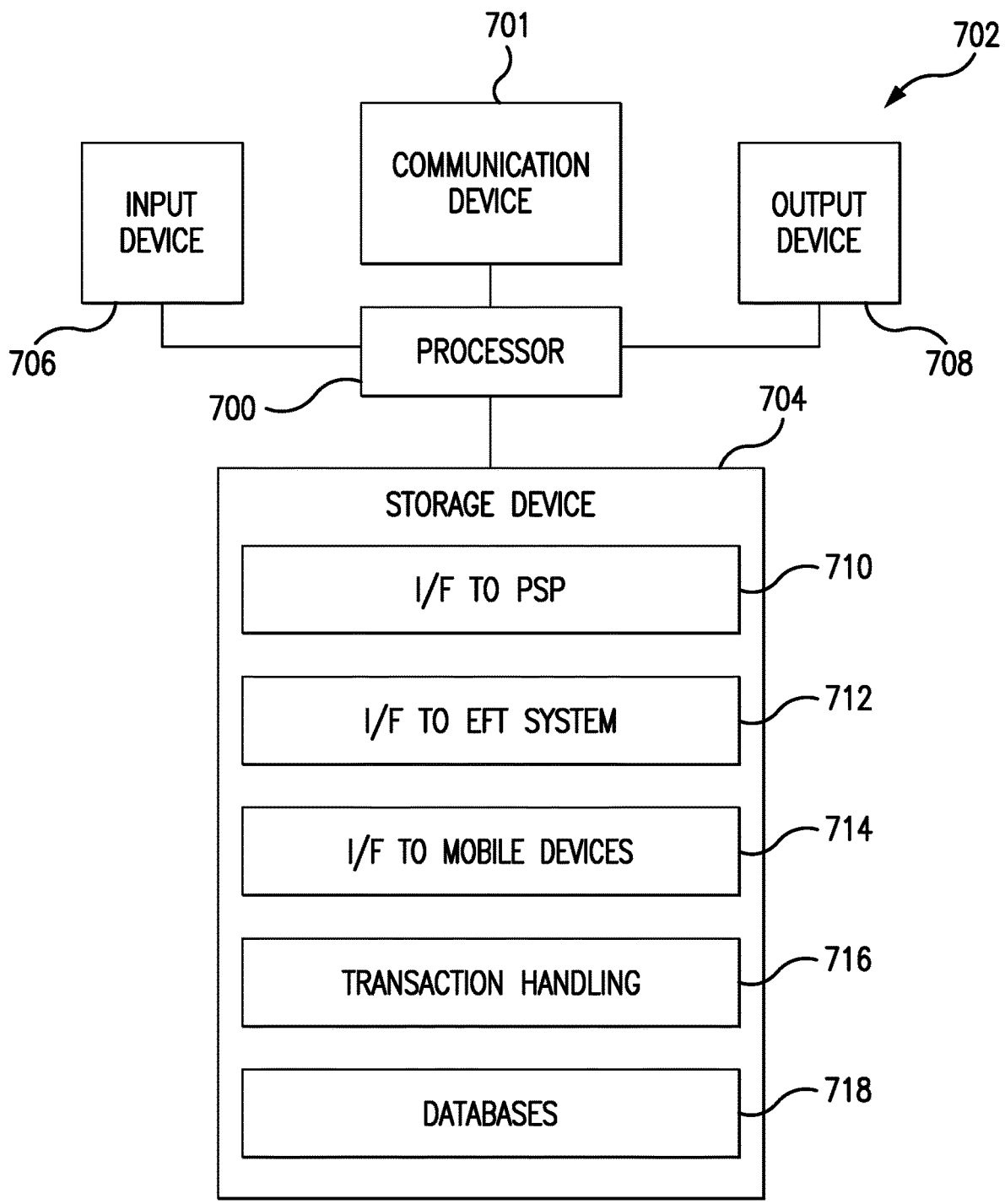
FIG. 7 if a block diagram of another computer system that may play a role in the system of FIG. 2.

FIG. 7 is a block diagram of an example computer system 702 that may perform functions in the payment system of FIGS. 2/3. The computer system 702 may be operated by the user's bank 208, and may accordingly be referred to hereinafter as a "bank computer". The bank computer 702 may be constituted by computer hardware having the same types of components and hardware architecture as described herein with reference to FIG. 6. Accordingly, the bank computer 702 may include a computer processor 700 operatively coupled to a communication device 701, a storage device 704, an input device 706 and an output device 708. The communications device 701, the storage device 704, the input device 706 and the output device 708 may all be in communication with the processor 700.

Storage device 704 stores one or more programs for controlling processor 700. The programs comprise program instructions (which may be referred to as computer readable program code means) that contain processor-executable process steps of the bank computer 702, executed by the processor 700, to cause the bank computer 702 to function as described herein.

The programs may include one or more conventional operating systems (not shown) that control the processor 700 so as to manage and coordinate activities and sharing of resources in the bank computer 702, and to serve as a host for application programs (described below) that run on the bank computer 702.

The programs stored in the storage device 704 may include, for example, a software interface 710 that supports communications between the bank computer 702 and the payment services provider computer 602.

The storage device 704 may further store a software interface 712 that supports communications between the bank computer 702 and the EFT system of the payment switch/network 106.

Still further, the storage device 704 may store a software interface 714 that supports communications between the bank computer 702 and mobile devices operated by users/bank customers.

In addition, the storage device 704 may store a transaction handling application program 716. The transaction handling application program 716 may operate to handle payment transactions requested by users/bank customers, as described herein.

The storage device 704 may also store, and the bank computer 702 may also execute, other programs, which are not shown. For example, such programs may include communications software and a reporting application. The latter program may respond to requests from system administrators for reports on the activities performed by the bank computer 702. The other programs may also include, e.g., device drivers, database management software, etc.

The storage device 704 may also store one or more databases 718 needed for operation of the bank computer 702.

In operation, the system 200 may require merchants and users to register before using the system 200 to engage in payment transactions. In some embodiments, there may be two options for registration of merchants and users. According to the first option, merchants and/or users may interact with the payment services provider 202 (e.g., via one or more websites hosted by the payment services provider 202). In such interactions, the merchant or the user, as the case may be, may create a merchant or user profile in the payment services provider computer 602. The profile may include a proxy identifier/alias (e.g., phone number or e-mail address) for the merchant/user along with bank account details (such as routing number, account number, etc.). In the case of the merchant, a name (e.g., a business name) and address may be supplied for the profile in addition to or instead of the proxy identifier. In situations, as described below, where all transactions for a given merchant are at a fixed price, such fixed price/transaction amount may be included in the merchant profile for the merchant in question.

According to another option, registration with the payment services provider may occur via the users'/merchants' banks. In such a case, the merchant or user may opt in to the merchant's or user's bank's directory, by authorizing the bank to create a merchant/user profile to be shared with the payment services provider. The profile may have the same kinds of information referred to in the previous paragraph and may include only information that is already available in the bank's data processing systems. This option may be preferable in that it may relieve the merchants/users from performing data entry, and may allow the payment services provider to market the payment services described herein on a large scale via the banks. Also, with profiles generated by the banks, the payment services provider may receive the profiles in batches from the banks, thereby conserving computing resources for the payment services provider.

In the case of a merchant, the merchant alias or proxy identifier (e-mail address or phone number) may require a suffix to identify a specific location (e.g., a specific store/checkout location within a store). The merchant profile may also include a merchant category code (MCC), a location address, a merchant ID and a terminal ID. As will be seen from subsequent discussion, to enable processes as described below, the merchant may provide a QR code for scanning by the user/customer at the point of sale. The QR code may be static and printed/generated ahead of time by the merchant or the QR code may be dynamic and generated at the time of a purchase transaction to reflect at least some details of the purchase transaction.

Figure 8:
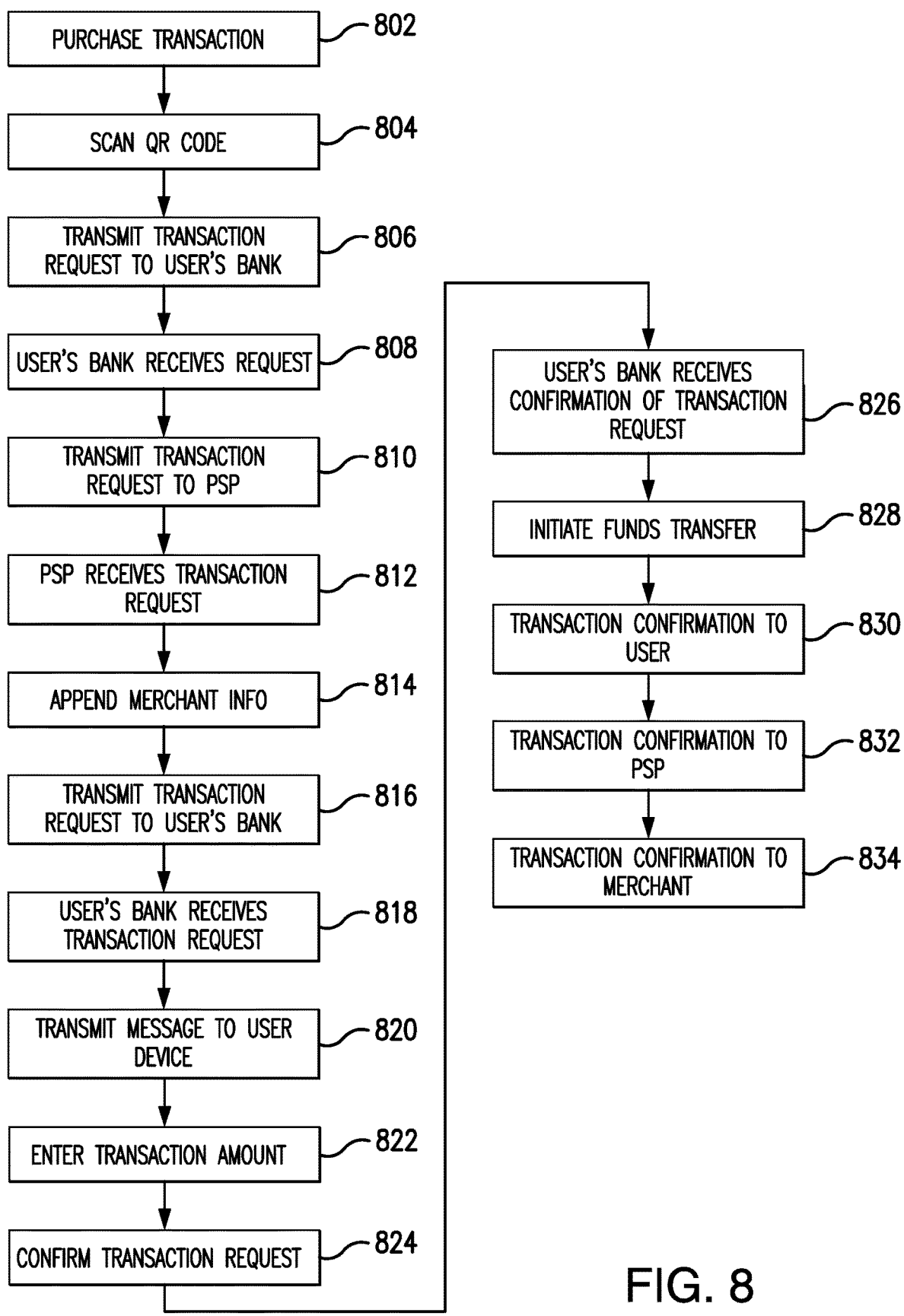
FIGS. 8, 9, 10, 11 and 12 are flow charts that illustrate processes that may be performed in accordance with aspects of the present disclosure.

FIG. 8 is a flow chart that illustrates a process that may be performed according to aspects of the present disclosure.

At 802 in FIG. 8, a purchase transaction takes place at a retail store operated by the merchant. That is, the user/customer may visit the retail store, select one or more items for purchase, carry the item(s) to a checkout counter, and allow a store employee to scan the item identifier(s) into a POS terminal (e.g., POS device 400, FIG. 4). The POS terminal may calculate a total amount due from the user to the merchant for the transaction.

At block 804 in FIG. 8, in order to launch a payment transaction to settle the purchase transaction, the user may employ his/her mobile device (e.g., mobile device 500, FIG. 5) to scan a QR code presented to the user by the store employee. It is assumed for the purposes of the process of FIG. 8 that the QR code is static, and contains data that identifies the merchant (e.g., an alias or proxy identifier for the merchant).

Block 806 may follow block 804 in the process of FIG. 8. At block 806, the (user's) mobile device 500 may transmit, to the user's bank 208, a request for payment to be made to the merchant. The payment request may include the data that identifies the merchant, as well as identifying information (again, perhaps an alias) for the user.

At block 808, the user's bank 208 receives the payment request transmitted at 806.

At block 810, the user's bank 208 may transmit the payment request to the payment services provider 202. As transmitted to the payment services provider 202, the payment request may include the merchant's alias.

At block 812, the payment services provider 202 receives the payment request as transmitted by the user's bank 208 at 810.

At block 814, the payment services provider 202 may append additional information to the payment request. The additional information may include the banking details (bank name/routing number and account number) for the merchant. This appending process may include retrieving such additional information from one or more directories (e.g., the directory 618, FIG. 6) stored by the payment services provider 202.

At block 816, the payment services provider 202 may transmit the payment request (including merchant's name and banking details) to the user's bank 208. At block 818, the user's bank 208 receives the payment request, with appended merchant-related information, as transmitted by the payment services provider 202.

At block 820, the user's bank 208 may transmit a message to the user (i.e., to the user's mobile device 500). The message may include the name of the merchant. It may be desirable that the message sent at 820 to the user not include the merchant's banking details; i.e., it may be desirable that the latter information be kept private from the user. The message may prompt the user to enter the transaction amount, and to confirm that the user's wish is that the requested payment be made.

At 822, the user may interact with his/her mobile device 500 to enter the transaction amount (as provided to the user by the merchant) into the mobile device 500.

At block 824, the user may confirm that the requested payment go forward. This may involve the user interacting with the mobile device 500. For example, the user may actuate a virtual button such as "confirm payment" displayed by the mobile device 500. The process at block 824 may also include the mobile device 500 requiring authentication of the user before the confirmation of payment is allowed to become effective. The user authentication may include entry of a PIN (personal identification number) or password or a biometric user authentication process (e.g., fingerprint scan and verification). Block 824 may also be considered to include transmission to the user's bank from the mobile device 500 of the buyer's confirmation of the payment request. Block 826 represents the user's bank receiving the confirmation of the payment request.

Block 828 may occur in response to the bank's receipt of the user's confirmation. At block 828, the user's bank may initiate an EFT/ACH transaction to transfer the transaction amount from the user's bank account to the merchant's bank account. It may also be assumed in connection with block 828 that the EFT/ACH transaction is completed successfully, including involvement of the payment switch/network 106 in response to funds transfer messaging by the user's bank 208, and receipt of the funds transfer by the merchant's bank 210 on behalf of the merchant.

At block 830, the user's bank 208 may send a confirmation message to the mobile device 500 in order to confirm to the user that the payment transaction funds transfer has occurred.

At block 832, the user's bank 208 may send a confirmation message to the payment services provider 202 to confirm that the requested payment funds transfer has been completed.

At block 834, the payment services provider 202 may send a confirmation to the merchant (i.e., in some embodiments, to the POS device 400) in order to confirm to the merchant that payment for the purchase transaction has occurred. The purchase transaction may then be deemed complete, and the user may leave the retail store, taking the purchased item(s) with him/her.

In the process of FIG. 8, it has been assumed that there has been a functional and data communications integration between the payment service provider's data processing system and the user's bank's data processing system, whereby the interaction between the payment service provider and the user's bank is enabled, particularly as referred to in connection with steps 810 through 832 of FIG. 8. In other embodiments, or at least with respect to other transactions, such integration may not have occurred. Consequently, an alternative process flow may take place, as now will be described with reference to FIG. 9.

Figure 9:
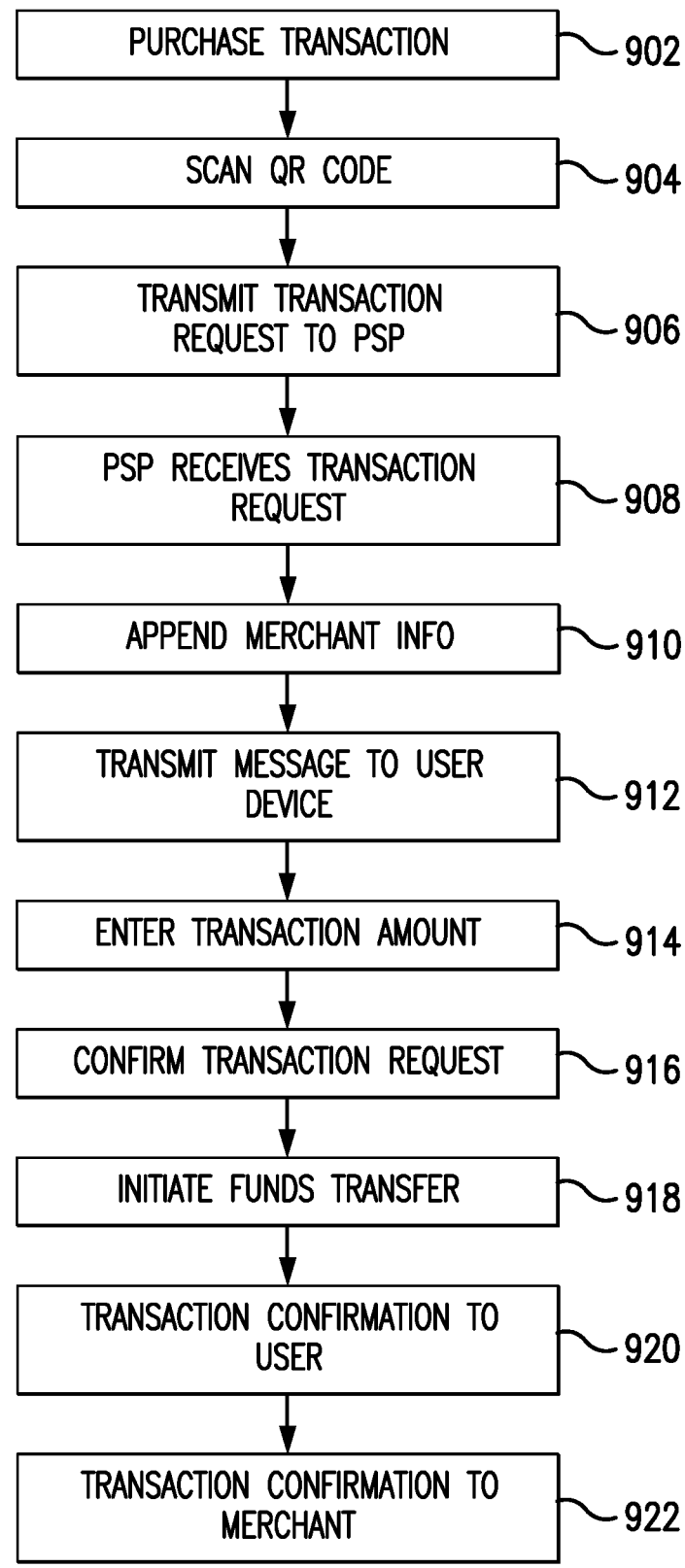

FIG. 9 is a flow chart that illustrates a process that may be performed in accordance with aspects of the present disclosure.

At 902 in FIG. 9 (similar to block 802 in FIG. 8), a purchase transaction takes place at a retail store operated by the merchant. That is, the user/customer may visit the retail store, select one or more items for purchase, carry the item(s) to a checkout counter, and allow a store employee to scan the item identifier(s) into a POS terminal (e.g., POS device 400, FIG. 4). The POS terminal may calculate a total amount due from the user to the merchant for the transaction.

At block 904 in FIG. 9 (similar to block 804 in FIG. 8), in order to launch a payment transaction to settle the purchase transaction, the user may employ his/her mobile device (e.g., mobile device 500, FIG. 5) to scan a QR code presented to the user by the store employee. It is assumed for the purposes of the process of FIG. 9 that the QR code is static, and contains data that identifies the merchant (e.g., an alias or proxy identifier for the merchant).

Block 906 may follow block 904 in the process of FIG. 9. At block 906, the (user's) mobile device 500 may transmit, to the payment services provider 202, a request for payment to be made to the merchant. The request for payment may include the data that identifies the merchant, as well as identifying information (again, perhaps an alias) for the user.

At block 908, the payment services provider 202 receives the payment request as transmitted at 906.

At block 910, the payment services provider 202 may append additional information to the payment request. The additional information may include the banking details (bank name/routing number and account number) for the merchant. Banking details for the user may also be appended to the payment request by the payment services provider at this point. This appending process may include retrieving such additional information from the one or more directories (e.g., the directory 618, FIG. 6) stored by the payment services provider 202.

At block 912, the payment services provider 202 may transmit a message to the user (i.e., to the user's mobile device 500). The message may include the name of the merchant.

It may be desirable that the message sent at 912 to the user not include the merchant's banking details; i.e., it may be desirable that the latter information be kept private from the user. The message may prompt the user to enter the transaction amount, and to confirm that the user's wish is that the requested payment be made.

At 914, the user may interact with his/her mobile device 500 to enter the transaction amount (as provided to the user by the merchant) into the mobile device 500.

At block 916, the user may confirm that the requested payment go forward. This may involve the user interacting with the mobile device 500. For example, the user may actuate a virtual button such as "confirm payment" displayed by the mobile device 500. The process at block 916 may also include the mobile device 500 requiring authentication of the user before the confirmation of payment is allowed to become effective. The user authentication may include entry of a PIN (personal identification number) or password or a biometric user authentication process (e.g., fingerprint scan and verification). Block 916 may also be considered to include transmission to the payment services provider from the mobile device 500 of the buyer's confirmation of the payment request.

Block 918 may occur in response to the payment service provider's receipt of the user's confirmation. At block 918, the payment services provider 202 may communicate with the payment switch/network 106 (e.g., as per the topology of FIG. 3) to initiate an EFT/ACH transaction to transfer the transaction amount (i.e., the requested payment amount) from the user's bank account to the merchant's bank account. It may also be assumed in connection with block 918 that the EFT/ACH transaction is completed successfully, including involvement of the payment switch/network 106 to execute a transfer of funds from the user's bank 208 to the payment recipient's bank 210.

At block 920, the payment services provider 202 may send a confirmation message to the mobile device 500 in order to confirm to the user that the payment transaction funds transfer has occurred.

At block 922, the payment services provider 202 may send a confirmation to the merchant (i.e., in some embodiments, to the POS device 400) in order to confirm to the merchant that payment for the purchase transaction has occurred. The purchase transaction may then be deemed complete, and the user may leave the retail store, taking the purchased item(s) with him/her.

In the processes described above in connection with FIGS. 8 and 9, a transaction amount that varied from transaction to transaction was accommodated. However, in some embodiments, or for some merchants, the transaction amount may be fixed in advance for all transactions. An example of such a merchant may be a transit system with a fixed, system-wide fare. A process that advantageously handles transactions for such merchants will now be described with reference to FIG. 10.

Figure 10:
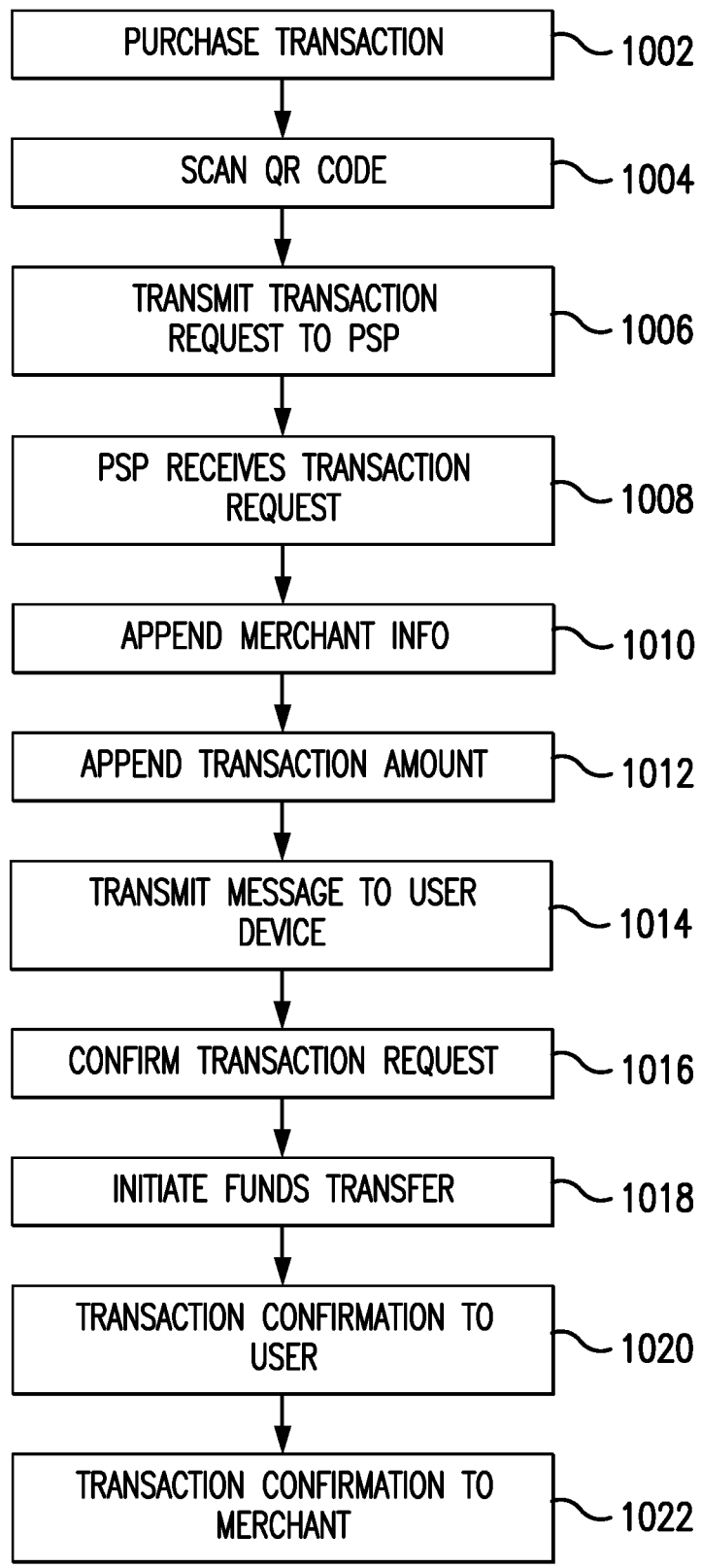

FIG. 10 is a flow chart that illustrates a process that may be performed in accordance with aspects of the present disclosure.

At 1002 in FIG. 10 a purchase transaction occurs or is requested (e.g., a transit-access transaction).

At block 1004 in FIG. 10, in order to launch a payment transaction for the desired access (or other fixed price) transaction, the user may employ his/her mobile device (e.g., mobile device 500, FIG. 5) to scan a QR code that is available for scanning at the locus of the access (or other) transaction. It is assumed for the purposes of the process of FIG. 9 that the QR code is static, and contains data that identifies the merchant (e.g., an alias or proxy identifier for the merchant). In some embodiments, the QR code may also indicate the transaction amount.

Block 1006 may follow block 1004 in the process of FIG. 10. At block 1006, the (user's) mobile device 500 may transmit, to the payment services provider 202, a request for payment to be made to the merchant. The request for payment may include the data that identifies the merchant, as well as identifying information (again, perhaps an alias) for the user. Where the QR code indicates the transaction amount, the latter may also be included in the request for payment.

At block 1008, the payment services provider 202 receives the payment request as transmitted at 1006.

At block 1010, the payment services provider 202 may append additional information to the payment request. The additional information may include the banking details (bank name/routing number and account number) for the merchant. Banking details for the user may also be appended to the payment request by the payment services provider at this point. This appending process may include retrieving such additional information from one or more directories (e.g., the directory 618, FIG. 6) stored by the payment services provider 202. In situations and/or embodiments where the transaction amount was not included in the payment request as transmitted at 1006, further processing by the payment services provider 202 (as represented at block 1012) may include looking up the (fixed) transaction amount in the directory entry for the merchant and appending the transaction amount to the payment request.

At block 1014, the payment services provider 202 may transmit a message to the user (i.e., to the user's mobile device 500). The message may include the name of the merchant. The message may prompt the user to confirm that the user's wish is that the requested payment be made.

At block 1016, the user may confirm that the requested payment go forward. This may involve the user interacting with the mobile device 500. For example, the user may actuate a virtual button such as "confirm payment" displayed by the mobile device 500. The process at block 1016 may also include the mobile device 500 requiring authentication of the user (as described above in connection with FIGS. 8 and 9) before the confirmation of payment is allowed to become effective.

Block 1018 may occur in response to the payment service provider's receipt of the user's confirmation. At block 1018, the payment services provider 202 may communicate with the payment switch/network 106 (e.g., as per the topology of FIG. 3) to initiate an EFT/ACH transaction to transfer the transaction amount from the user's bank account to the merchant's bank account. It may also be assumed in connection with block 1018 that the EFT/ACH transaction is completed successfully, including involvement of the payment switch/network 106 to execute a transfer of funds from the user's bank 208 to the payment recipient's bank 210.

At block 1020, the payment services provider 202 may send a confirmation message to the mobile device 500 in order to confirm to the user that the payment transaction funds transfer has occurred.

At block 1022, the payment services provider 202 may send a confirmation to the merchant in order to confirm to the merchant that payment for the access (or other) transaction has occurred.

In the processes described in connection with FIGS. 8-10, it was assumed that a static QR code was made available for scanning by the user's mobile device at the point of sale. Alternatively, however, a dynamic QR code may be provided that is generated specifically for (and with data reflecting) the current transaction. Processes that utilize a dynamic QR code will now be described, initially with reference to FIG. 11.

Figure 11:
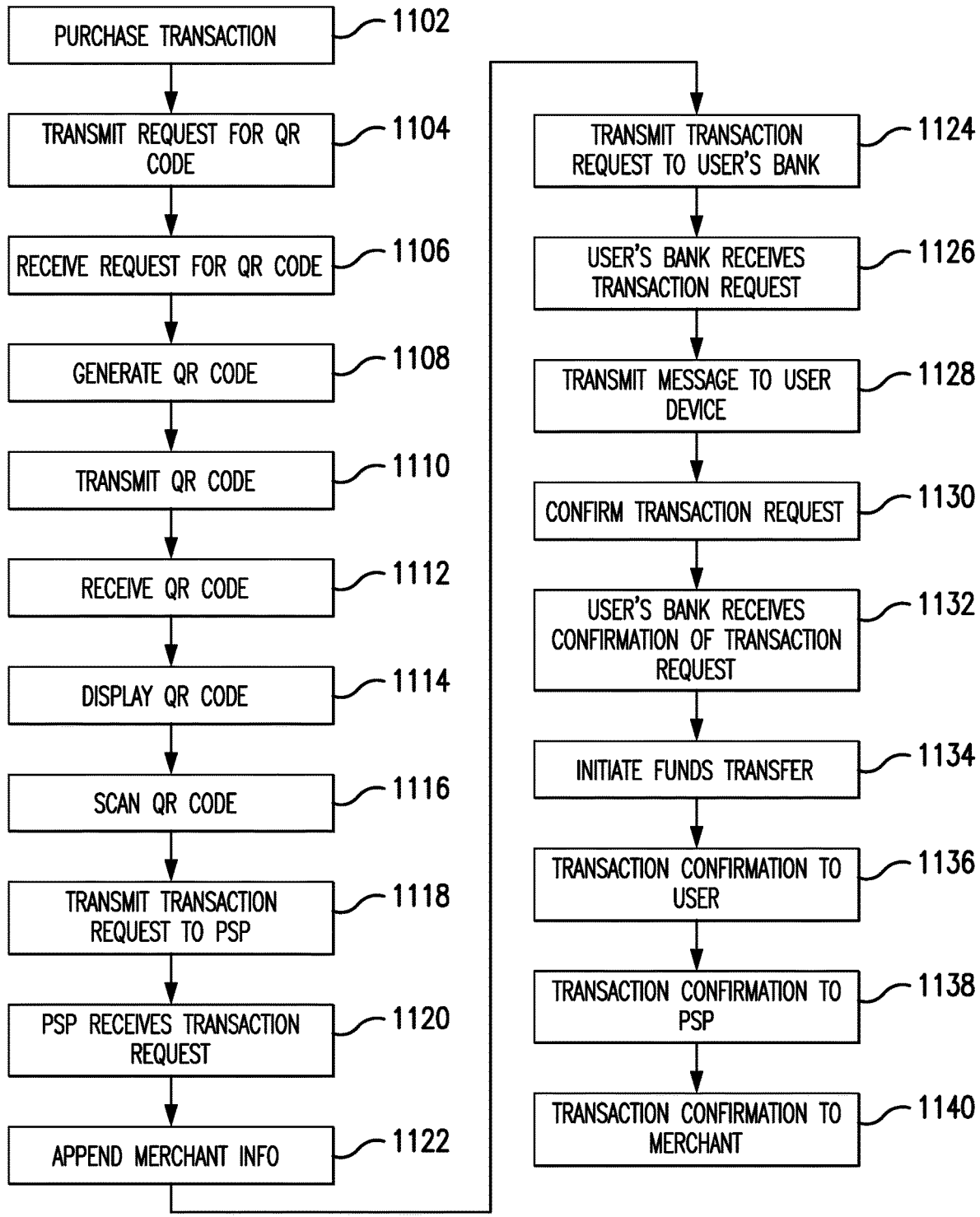

FIG. 11 is a flow chart that illustrates a process that may be performed according to aspects of the present disclosure.

At 1102 in FIG. 11, a purchase transaction takes place at a retail store operated by the merchant. That is, the user/customer may visit the retail store, select one or more items for purchase, carry the item(s) to a checkout counter, and allow a store employee to scan the item identifier(s) into a POS terminal (e.g., POS device 400, FIG. 4). The POS terminal may calculate a total amount due from the user to the merchant for the transaction.

At 1104 in FIG. 11, the merchant employee opens a QR application that runs on the POS device 400. The QR application receives the transaction amount and/or item description(s) from other software entities running on the POS device 400. The merchant employee interacts with the POS device 400 to cause the POS device 400 to transmit a request for a QR code to the payment services provider 202. The request contains at least an alias to identify the merchant that is transmitting the request and information related to the transaction, such as transaction amount.

At 1106, the payment services provider 202 receives the request that was sent at 1104.

At 1108, the payment services provider 202 generates the requested QR code. The QR code as generated by the payment services provider 202 may include the merchant alias/proxy identifier, transaction amount, description of purchased item(s) and geolocation information.

At 1110, the payment services provider 202 transmits the QR code (as generated at 1108) to the POS device 400 (i.e., to the merchant).

At 1112, the POS device 400 receives the QR code that was transmitted by the payment services provider 202 at 1110.

At 1114, the POS device 400 displays the QR code (received at 1112) on a display component of the POS device 400.

At block 1116 in FIG. 11, in order to launch a payment transaction to settle the purchase transaction, the user may employ his/her mobile device (e.g., mobile device 500, FIG. 5) to scan the QR code displayed by the POS device 400.

Block 1118 may follow block 1116 in the process of FIG. 11. At block 1118, the (user's) mobile device 500 may transmit, to the payment services provider 202, a request for payment to be made to the merchant. The payment request may include the data (e.g., alias/proxy identifier) that identifies the merchant, as well as identifying information (again, perhaps an alias) for the user. The payment request also includes the transaction amount, as supplied to the user via the scanned QR code.

At block 1120, the payment services provider 202 receives the payment request as transmitted at 1118.

At block 1122, the payment services provider 202 may append additional information to the payment request. The additional information may include the banking details (bank name/routing number and account number) for the merchant. This appending process may include retrieving such additional information from one or more directories (e.g., the directory 618, FIG. 6) stored by the payment services provider 202. The information appended at this point may also include the banking details for the user.

At block 1124, the payment services provider 202 may transmit the payment request (including merchant's name and banking details, and the user's identifier) to the user's bank 208. At block 1126, the user's bank 208 receives the payment request, with appended merchant-related information, as transmitted by the payment services provider 202.

At block 1128, the user's bank 208 may transmit a message to the user (i.e., to the user's mobile device 500). The message may include the name of the merchant and the transaction amount for the user's approval/confirmation. It may be desirable that the message sent at 820 to the user not include the merchant's banking details; i.e., it may be desirable that the latter information be kept private from the user. The message may prompt the user to confirm that the transaction amount is correct and that the user's wish is that the requested payment be made.

At block 1130, the user may confirm that the requested payment go forward. This may involve the user interacting with the mobile device 500. For example, the user may actuate a virtual button such as "confirm payment" displayed by the mobile device 500. The process at block 1130 may also include the mobile device 500 requiring authentication of the user before the confirmation of payment is allowed to become effective. The user authentication may include entry of a PIN (personal identification number) or password or a biometric user authentication process (e.g., fingerprint scan and verification). Block 1130 may also be considered to include transmission to the user's bank from the mobile device 500 of the buyer's confirmation of the payment request. Block 1132 represents the user's bank receiving the confirmation payment request.

Block 1134 may occur in response to the bank's receipt of the user's confirmation. At block 1134, the user's bank may initiate an EFT/ACH transaction to transfer the transaction amount from the user's bank account to the merchant's bank account. It may also be assumed in connection with block 1134 that the EFT/ACH transaction is completed successfully, including involvement of the payment switch/network 106 in response to funds transfer messaging by the user's bank 208, and receipt of the funds transfer by the merchant's bank 210 on behalf of the merchant.

At block 1136, the user's bank 208 may send a confirmation message to the mobile device 500 in order to confirm to the user that the payment transaction funds transfer has occurred.

At block 1138, the user's bank 208 may send a confirmation message to the payment services provider 202 to confirm that the requested payment funds transfer has been completed.

At block 1140, the payment services provider 202 may send a confirmation to the merchant (i.e., in some embodiments, to the POS device 400) in order to confirm to the merchant that payment for the purchase transaction has occurred. The purchase transaction may then be deemed complete, and the user may leave the retail store, taking the purchased item(s) with him/her.

In the process of FIG. 11, it has been assumed that there has been a functional and data communications integration between the payment service provider's data processing system and the user's bank's data processing system, whereby the interaction between the payment service provider and the user's bank is enabled. In other embodiments, or at least with respect to other transactions, such integration may not have occurred. Consequently, an alternative process flow may take place, as now will be described with reference to FIG. 12.

Figure 12:
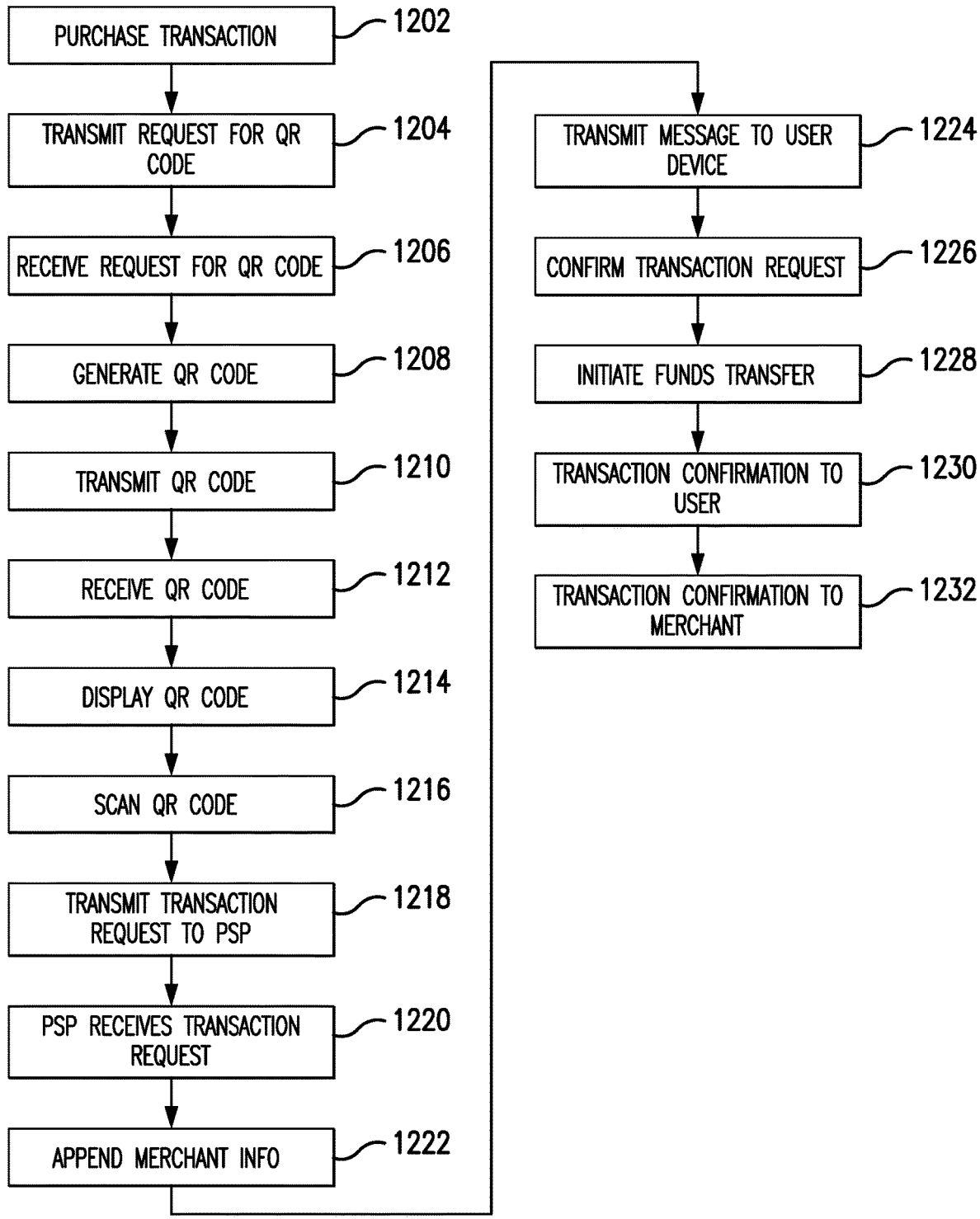

FIG. 12 is a flow chart that illustrates a process that may be performed according to aspects of the present disclosure.

At 1202 in FIG. 12, a purchase transaction takes place at a retail store operated by the merchant. That is, the user/customer may visit the retail store, select one or more items for purchase, carry the item(s) to a checkout counter, and allow a store employee to scan the item identifier(s) into a POS terminal (e.g., POS device 400, FIG. 4). The POS terminal may calculate a total amount due from the user to the merchant for the transaction.

At 1204 in FIG. 12, the merchant employee opens a QR application that runs on the POS device 400. The QR application receives the transaction amount and/or item description(s) from other software entities running on the POS device 400. The merchant employee interacts with the POS device 400 to cause the POS device 400 to transmit a request for a QR code to the payment services provider 202. The request contains at least an alias to identify the merchant that is transmitting the request and information related to the transaction, such as transaction amount.

At 1206, the payment services provider 202 receives the request that was sent at 1204.

At 1208, the payment services provider 202 generates the requested QR code. The QR code as generated by the payment services provider 202 may include the merchant alias/proxy identifier, transaction amount, description of purchased item(s) and geolocation information.

At 1210, the payment services provider 202 transmits the QR code (as generated at 1208) to the POS device 400 (i.e., to the merchant).

At 1212, the POS device 400 receives the QR code that was transmitted by the payment services provider 202 at 1210.

At 1214, the POS device 400 displays the QR code (received at 1212) on a display component of the POS device 400.

At block 1216 in FIG. 12, in order to launch a payment transaction to settle the purchase transaction, the user may employ his/her mobile device (e.g., mobile device 500, FIG. 5) to scan the QR code displayed by the POS device 400.

Block 1218 may follow block 1216 in the process of FIG. 12. At block 1218, the (user's) mobile device 500 may transmit, to the payment services provider 202, a request for payment to be made to the merchant. The payment request may include the data (e.g., alias/proxy identifier) that identifies the merchant, as well as identifying information (again, perhaps an alias) for the user. The payment request also includes the transaction amount, as supplied to the user via the scanned QR code.

At block 1220, the payment services provider 202 receives the payment request as transmitted at 1218.

At block 1222, the payment services provider 202 may append additional information to the payment request. The additional information may include the banking details (bank name/routing number and account number) for the merchant. This appending process may include retrieving such additional information from one or more directories (e.g., the directory 618, FIG. 6) stored by the payment services provider 202. The information appended at this point may also include the banking details for the user.

At block 1224, the payment services provider 202 may transmit a message to the user (i.e., to the user's mobile device 500). The message may prompt the user to confirm that the transaction amount is correct and that the user's wish is that the requested payment be made.

At block 1226, the user may confirm that the requested payment go forward. This may involve the user interacting with the mobile device 500. For example, the user may actuate a virtual button such as "confirm payment" displayed by the mobile device 500. The process at block 916 may also include the mobile device 500 requiring authentication of the user before the confirmation of payment is allowed to become effective.

Block 1228 may occur in response to the payment service provider's receipt of the user's confirmation. At block 1228, the payment services provider 202 may communicate with the payment switch/network 106 (e.g., as per the topology of FIG. 3) to initiate an EFT/ACH transaction to transfer the transaction amount (i.e., the requested payment amount) from the user's bank account to the merchant's bank account. It may also be assumed in connection with block 1228 that the EFT/ACH transaction is completed successfully, including involvement of the payment switch/network 106 to execute a transfer of funds from the user's bank 208 to the payment recipient's bank 210.

At block 1230, the payment services provider 202 may send a confirmation message to the mobile device 500 in order to confirm to the user that the payment transaction funds transfer has occurred.

At block 1232, the payment services provider 202 may send a confirmation to the merchant (i.e., in some embodiments, to the POS device 400) in order to confirm to the merchant that payment for the purchase transaction has occurred. The purchase transaction may then be deemed complete, and the user may leave the retail store, taking the purchased item(s) with him/her.

With systems and payment transaction flows as described above, the convenient and cost-effective technique of launching payment transactions via QR code scanning may be advantageously adapted to a payment system in which EFT/ACH systems are accessed to transfer funds directly to a merchant's bank account from a customer's bank account. In some environments, this may provide faster payments and/or less expensive payment systems.

Although transactions described herein explicitly refer to purchases of goods, this is not intended to be limiting; i.e., the payment arrangements described herein are also applicable to purchases of services.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omitting one or more steps.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. An optical scan triggered electronic funds transfer (EFT) method comprising:
   receiving, by a payment services provider computer from a merchant point of sale (POS) device of a merchant, a request for a dynamic quick response (QR) code comprising a transaction amount, a merchant identifier and geolocation information;
   generating, by the payment services provider computer, the dynamic QR code by using at least the merchant identifier, the transaction amount and the geolocation information;
   transmitting, by the payment services provider computer, the dynamic QR code to the POS device;
   receiving, by the payment services provider computer from a user mobile device, a transaction request including the merchant identifier scanned by the user mobile device from the dynamic QR code presented by a display of the POS device, the transaction request proposing a payment transaction and not identifying any financial account that belongs to the merchant, wherein the payment services provider computer is remote from said user mobile device;
   retrieving, by the payment service provider computer from at least one directory, the merchant's banking details and user banking details;
   appending, by the payment services provider computer, the merchant's banking details and user banking details to the received transaction request;
   transmitting, by the payment services provider computer to the user mobile device, a name that identifies the merchant without identifying the merchant's banking details;
   receiving, by the payment services provider computer, an indication from the user mobile device confirming the transaction;
   in response to the indication, initiating, by the payment services provider computer with a payment/switch network, a funds transfer in an EFT (electronic funds transfer) system for the transaction amount from a user account associated with the user banking details to a merchant account associated with the merchant's banking details; and
   transmitting, by the payment services provider computer, to the merchant POS device and to the user mobile device, a confirmation message that the funds transfer has been performed.

2. The method of claim 1, further comprising:
   prior to said appending step, retrieving, by the payment services provider computer, the merchant's banking details from a directory.

3. The method of claim 1, wherein the merchant is a mass transit system.

4. A payment services provider computer for conducting an optical scan triggered electronic funds transfer (EFT) comprising:
   a processor;
   a communication device operably connected to the processor; and
   a storage device operably connected to the processor, wherein the storage device stores processor executable instructions which when executed cause the processor to:
      receive a request for a dynamic quick response (QR) code from a merchant point of sale (POS) device of a merchant, wherein the request for the dynamic QR code comprises a transaction amount, a merchant identifier and geolocation information;
      generate the dynamic QR code by using at least the merchant identifier, the transaction amount and the geolocation information;
      transmit the dynamic QR code to the POS device;
      receive a transaction request from a user mobile device that was optically scanned by the user mobile device from a dynamic QR code presented on a display screen of the POS device by a merchant, wherein the transaction request includes a merchant identifier without identifying any financial account belonging to the merchant;
      retrieve the merchant's banking details and user banking details from at least one directory;
      append banking details of the merchant and user banking details to the transaction request;
      transmit a name identifying the merchant to the user mobile device without identifying the merchant's banking details;
      receive an indication from the user mobile device confirming the transaction;
      initiate with a payment/switch network a funds transfer in an EFT (electronic funds transfer) system for the transaction amount from a user account associated with the user banking details to a merchant account associated with the merchant's banking details; and
      transmit a confirmation message that the funds transfer has been performed to the merchant POS device and to the user mobile device.

5. The payment services computer of claim 4, wherein the POS of the merchant is a mass transit system POS.